UNITED STATES PATENT OFFICE 2,483,838

DIISOBUTYL SUBSTITUTED HETEROCYCLIC COMPOUNDS

Joseph B. Niederl, Brooklyn, N. Y.

No Drawing. Application November 22, 1944,
Serial No. 564,711

7 Claims. (Cl. 260—243)

This invention relates to ring substituted heterocyclic compounds in which at least one of the ring substituents is a long-chain aliphatic radical.

More specifically, this invention relates to the preparation of quinolines, benzoxazoles, benzthiazoles, phenazines, phenoxazines and phenthiazines possessing at least one tt-octyl

alpha, alpha, gamma, gamma tetramethyl butyl, or "diisobutyl") radical as one of the ring substituents.

The basic starting materials in the preparation of the above types of heterocyclics are phenols, nitro- and aminophenols, or aminothio-phenols possessing the above mentioned tt-octyl radical. These materials are derivatives of 4-tt-octylphenol ("diisobutylphenol," p-alpha, alpha, gamma, gamma tetramethyl butylphenol,

and have been previously described in the chemical literature (J. B. Niederl, Ind. Eng. Chem. vol. 30, pp. 1269–1274).

The resulting products exhibit certain desirable physical, chemical and physiological properties, not shown by their unsubstituted or short-chain alkylated homologues. The tt-octyl radical ("diisobutyl" group) confers its inherent outstanding characteristics such as: fat and lipoid solubility, extreme stability, and high bactericidal activity, to the above mentioned types of heterocyclics. Thus, an intramolecular blending of highly desirable characteristics is achieved, yet only readily available and inexpensive raw materials are utilized.

In practicing the present invention, there is provided an alkyl substituted phenol, the substituent being an aliphatic alkyl radical of at least eight carbon atoms, as for example p-tt-octyl phenol, or tt-octyl catechol, or their derivatives containing an additional reaction substituent in the ring. The phenol is mixed with another organic compound capable of undergoing cyclization reactions. The mixture is heated for a sufficient time and under such conditions as to cause a reaction to take place with the formation of a heterocyclic ring ortho condensed to the benzene nucleus of the phenol. The product thus formed may be subjected to suitable purification.

The following are specific examples of the making of compounds in accordance with the principles herein set forth:

*Example 1.—5-tt-octyl-8-hydroxy-quinoline*

Sixteen grams of 2-amino-4-tt-octylphenol hydrochloride, 28 grams of glycerol, 27.5 grams of concentrated sulfuric acid and 2.5 grams of picric acid are mixed and then slowly heated until the temperature in the reaction flask reaches 175° C. The reaction mixture is kept at this temperature and small portions withdrawn from time to time. The reaction is stopped when a copious precipitate with bromine water is given by the sample thus withdrawn. After 1½ to 2 hours the reaction is usually complete. The reaction mixture is then allowed to cool and poured into water. The water solution is then filtered and the filtrate neutralized with solid sodium carbonate whereby the 5-tt-octyl-8-hydroxy quinoline precipitates out. M. P. 73° C. The compound is not precipitated by ammonia from its solutions in mineral acids, but forms precipitates with picric acid (M. P. 85° C.) and with bromine water (M. P. 168° C.). The structural formula of the compound is most likely:

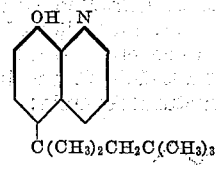

In a similar manner or with minor modifications any other of the tt-octyl substituted mono hydroxy phenols, such as the diisobutyl cresols, can be converted into the respective tt-octyl substituted hydroxy quinolines.

*Example 2.—5-tt-octylbenzoxazole*

A mixture consisting of 12 grams of 2-nitro-4-tt-octylphenol, 20 grams of mossy zinc, 50 ml. of formic acid and 5 ml. of dilute hydrochloric acid (1:1) is refluxed for seven hours, after which time another 5 ml. of hydrochloric acid is added. The refluxing is then continued for another seven hours. After this time the reaction product, in the form of a tar, is separated from unreacted zinc and without isolation of the intermediate 4-tt-octyl-2-formyl-aminophenol (M. P. 157° C.) and is subjected to distillation under reduced pressure. The final product, the 5-tt-octyl-benzoxazole distills at 158–159° C. at 100 mm. pressure and melts at 48.5° C. The structural formula of the compound is most likely:

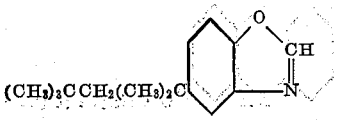

Using acetic or propionic acid, 2-methyl-, 2-ethyl-5-tt-octylbenzoxazoles are produced. Employing other tt-octyl substituted mono hydroxy phenols the respective further substituted tt-octyl-benzoxazoles are obtained.

*Example 3.—3-tt-octylphenazine*

A mixture consisting of one-tenth mol each of o-phenylene diamine (11 grams) and 4-tt-octyl-1,2-dihydroxy-benzene, "diisobutyl" catechol, (22.2 grams) is heated in a pressure bottle, or in an autoclave at 260–280° C. for 40 hours. After cooling, the reaction mixture is washed with water and then with alkali. It is then extracted with ether. The ether extract is treated with charcoal, filtered and the reaction product allowed to crystallize. M. P. 150–151° C. The structural formula of the compound is most likely:

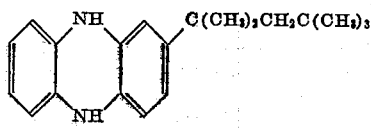

*Example 4.—4-tt-octyl phenoxazine*

One-tenth of a mol (11 grams) of catechol, one-tenth of a mol (22 grams) of 4-tt-octyl-2-aminophenol ("diisobutyl aminophenol"), and 2.5 grams of the foregoing aminophenol hydrochloride are placed into a reaction vessel provided with a three-hole stopper. This stopper is provided with a thermometer, a gas inlet and a gas outlet tube. Then while carbon dioxide gas is passed through, the mixture is gradually heated to 220–230° C. The reaction mixture is kept at this temperature until no more water distills off. This usually requires from 1 to 2 hours of heating. After this, the reaction mixture is allowed to cool while carbon dioxide is still passed through. The cooled melt is then extracted with hot benzene and the reaction product allowed to crystallize out of the filtered benzene extract. The reaction product melts at 138–140° C. and has most likely the following structural formula:

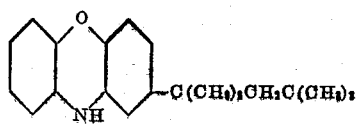

Substitution in the above reaction of tt-octyl catechol instead of plain catechol and of o-aminophenol instead of the 4-tt-octyl-2-amino-phenol produces the same compound. However, if the tt-octyl catechol alone is substituted 2,8-di-tt-octyl-phenoxazine, M. P. 125–127° C. is produced.

*Example 5.—4-tt-octyl phenthiazine*

A mixture consisting of one tenth of a mol each of tt-octyl-catechol (22.2 grams) and o-amino-thiophenol (12.5 grams) is heated in a pressure bottle, or in an autoclave, for 30 hours at a temperature of 220–240° C. After cooling the melt is washed with water and then with alkali. The tarry reaction product is then extracted with hot benzene, or a similar type of organic solvent, the extract filtered and the product allowed to crystallize. The product melts at 131–133° C. and has most likely the following structural formula:

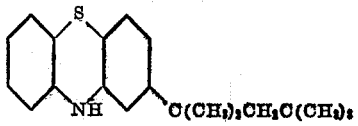

Although in the foregoing examples only octylphenols and their derivatives have been utilized as starting materials, this invention is not at all limited to the employment of these types of phenols alone; instead of them longer chain substituted phenols, such as the decyl-, dodecyl-, tetradecyl- or hexadecyl phenols and their derivatives may be similarly utilized in the preparation of the correspondingly C-alkylated N-, N,N-, N,O- and N,S- types of heterocyclic compounds.

I claim:
1. 3-diisobutyl-phenazine.
2. 4-diisobutyl-phenoxazine.
3. 4-diisobutyl-phenthiazine.
4. A method of making ring C-alkylated heterocyclic compounds which comprises mixing

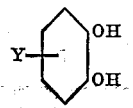

with a compound of the following general formula:

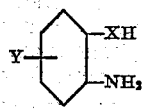

where X is taken from the class consisting of O, S and NH, and at least one Y is a diisobutyl radical having the following structure:

—C(CH₃)₂CH₂C(CH₃)₃ and the other is hydrogen, and heating said mixture to cause a reaction to take place forming a trinuclear compound of the following general formula:

5. Trinuclear nitrogen heterocyclic compounds of the following general formula:

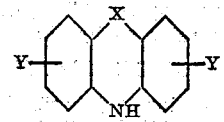

where X is taken from the class consisting of O, S and NH, and at least one Y is a diisobutyl radical having the following structure:

—C(CH₃)₂CH₂C(CH₃)₃ and the other is hydrogen.

6. Trinuclear nitrogen heterocyclic compounds of the following general formula:

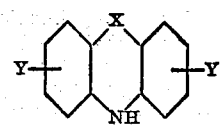

where X is taken from the class consisting of O, S and NH, and Y is a diisobutyl radical having the following structure: —C(CH₃)₂CH₂C(CH₃).

7. Trinuclear nitrogen heterocyclic compounds of the following general formula:

where X is taken from the class consisting of O, S and NH, and at least one Y is a diisobutyl radical having the following structure:

—C(CH₃)₂CH₂C(CH₃)₃ and the other is hydrogen.

JOSEPH B. NIEDERL.

REFERENCES CITED

The following references are of record in the file of this patent:

UNITED STATES PATENTS

| Number | Name | Date |
|---|---|---|
| 237,917 | Skraup | Feb. 15, 1881 |
| 2,042,205 | Britton et al. | May 26, 1936 |
| 2,083,181 | Zweifel | June 8, 1937 |
| 2,152,047 | Hahl | Mar. 28, 1939 |

OTHER REFERENCES

Hollins, Synthesis of Nitrogen Ring Compounds, pp. 241–250 (1924).

Beilstein, vol. XX, Vierte Auflage, pp. 413, 423, 424.

Beilstein, vol. XXI, Vierte Auflage, p. 119.

Beilstein, vol. XXII, Vierte Auflage, p. 103.

Beilstein, vols. XXVI–XXVII, Vierte Auflage, p. 497.